Nov. 28, 1961 H. NELSON 3,010,857

SEMI-CONDUCTOR DEVICES AND METHODS OF MAKING SAME

Filed March 1, 1954

INVENTOR.
HERBERT NELSON

BY J. L. Whittaker
ATTORNEY

United States Patent Office 3,010,857

Patented Nov. 28, 1961

3,010,857

SEMI-CONDUCTOR DEVICES AND METHODS OF MAKING SAME

Herbert Nelson, Princeton, N.J., assignor to Radio Corporation of America, a corporation of Delaware Filed Mar. 1, 1954, Ser. No. 413,369
1 Claim. (Cl. 148—33)

This invention relates to improved semi-conductor devices and methods of making them. More particularly it relates to improved semi-conductor devices of the alloy junction type that include a body of crystalline semi-conductive material.

To make an alloy type semi-conductor device a selected impurity material is surface alloyed to a semi-conductor body to form a rectifying barrier therein. The body is one of conductivity type, n or p, and the impurity material is usually selected from among those elements that are capable of imparting the opposite type conductivity, p or n respectively, to the body when dispersed therein.

Germanium and silicon are among the semi-conductive materials commonly used to make such devices. The elements of boron group of the periodic table are among the materials capable of imparting p-type conductivity to semi-conductive germanium or silicon when diffused therein. These materials, with the exception of boron, are all relatively soft and plastic and may be readily surface alloyed to semi-conductor bodies. Materials that impart n-type conductivity semi-conductive germanium or silicon, however, are crystalline and hard or brittle or, if they are plastic, are insulating so that they are unsuitable for use in many applications where it is desired to make an electrical contact to the surface alloyed material. It is often difficult successfully to surface alloy a hard or brittle material to a semi-conductor such as germanium or silicon because these materials are also relatively hard or brittle. Due to differences in crystal structures and in physical properties such as thermal expansion, strains tend to develop between two hard crystalline materials when they are joined by surface alloying.

The principal n-type impurity materials utilized in making alloy type devices with germanium and silicon are the metallic elements of the nitrogen group, namely, arsenic, antimony and bismuth. Because these elements are relatively hard and brittle and developed strains when alloyed in the pure state to germanium or silicon they have previously been mixed with lead or tin before being alloyed. Lead and tin are regarded as having substantially no effect upon the conductivity type of semi-conductive germanium or silicon. They are used as diluents, or carriers, for the n-type impurity materials to minimize the metallurgical strains produced by the n-type materials. Lead and tin are relatively soft but, for reasons not clearly understood, when they are mixed with significant quantities of arsenic, antimony or bismuth they do not alloy satisfactorily to germanium or silicon. Even using mixtures comprising 90% or more of lead or tin, strains appear to develop between the alloyed electrode material and the semi-conductor body. Sometimes the alloyed electrode separates itself from the semi-conductor body as a result of these strains and without the application of any external force.

Accordingly, one object of the instant invention is to provide improved materials that may be alloyed to crystalline semi-conductor bodies.

Another object of the invention is to provide improved materials that may be alloyed to semi-conductive germanium or silicon to form a rectifying electrode thereon.

Another object is to provide an improved method of making a rectifying barrier in a semi-conductor body.

These and other objects are accomplished by the instant invention according to which it has now been discovered that an improved device may be produced by alloying to a semi-conductor body a mixture of impurity materials of differing conductivity types, that is, capable of imparting opposite types of conductivity to said body. The impurity materials of one type are selected from among those having relatively large segregation coefficient in said body. The impurity materials of the opposite type are selected from among those having a relatively small segregation coefficient in said body. In particular, to provide an electrode of improved softness and malleability, indium or thallium mixed with a relatively small proportion of phosphorus or arsenic may be surface alloyed to a crystalline semi-conductor body to form an improved rectifying electrode thereon.

The invention will be described in greater detail in connection with the following example and the accompanying drawing of which:

Similar reference numerals are applied to similar elements throughout the drawing.

*Example*

Figure 1:
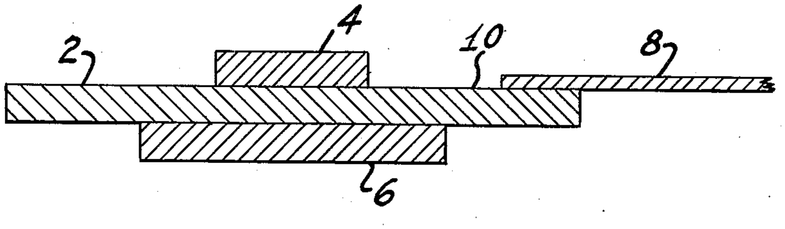
FIGURE 1 is a schematic, elevational, cross-sectional view of the constituent parts of a semi-conductor device before the alloy process according to the invention.

The drawing illustrates the production of a transistor according to the invention. Referring to FIGURE 1, a wafer 2 of p-type semi-conductive germanium is prepared by any known means for the alloy junction process. A typical wafer may be about .25" x .125" x .01" thick when cut from a relatively large crystal. The wafer is etched by immersion in an acid solution such as hydrofluoric acid to a thickness of about .006" to expose a clean, crystallographically undisturbed surface. A mixture, or solution of indium and phosphorus consisting of about 97 weight percent substantially pure indium and 3 weight percent phosphorus is prepared by dissolving phosphorus in molten indium in a non-oxidizing atmosphere and cooling the mixture. This weight proportion corresponds to about 12 atomic percent phosporus in about 88 atomic percent indium. Two pellets 4 and 6 are cut from this mixture and placed upon opposite sides of the wafer. The pellets may conveniently be discs about .005" thick and .010" and .025" in diameter, respectively. A tinned nickel tab 8 is placed upon one surface 10 of the wafer to provide a substantially non-rectifying base connection. The assembly is heated to about 500° C. for about five minutes to melt the pellets and to alloy them to the wafer. Simultaneously the base tab is soldered to the wafer. Electrical leads 12 and 14 as shown in FIGURE 2 may be attached to the electrodes to complete the device which may then be conventionally etched, mounted and potted.

Figure 2:
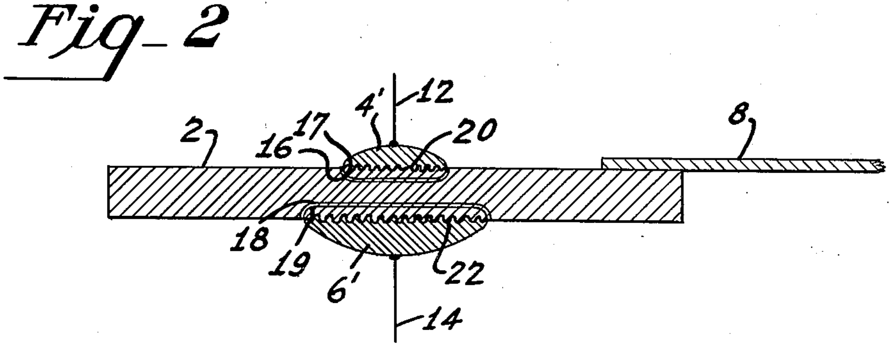
FIGURE 2 is a schematic, elevational, cross-sectional view of a completed device according to the invention.

The device thus produced is shown schematically in FIGURE 2. It consists of the base wafer 2, two electrodes 4' and 6' formed from the impurity material pellets, electrical leads 12 and 14 connected to the electrodes, two p-n rectifying junctions 16 and 18 each associated with one of the electrodes, and a base tab 8. The surfaces 17 and 19 at the maximum depth of penetration of the electrodes into the base wafer during the alloy process are called the alloy front. When the pellets are melted during the process they wet the wafer and dissolve respective surface portions of the wafer, penetrating partially through the wafer towards each other. Upon freezing, part of the germanium dissolved in the pellets recrystallizes back upon the wafer to form the recrystallized regions 20 and 22, respectively. Due to the segregation phenomenon, which will be explained in greater detail hereinafter, the recrystallized regions of the device are primarily controlled with respect to conductivity type by the phosphorus rather than by the indium. The major portion of the wafer remains p-type while the recrystallized regions are converted to n-type conductivity by the preferential inclusion of phosphorus atoms. The p-n rectifying junctions 16 and 18 are formed adjacent to the alloy fronts.

The term "segregation coefficient" is a quantitative expression for a phenomenon of freezing. As a molten mass of a material containing dissolved impurities is slowly frozen along its length, a difference usually occurs between the impurity concentrations in the liquid and in the solid. The segregation coefficient may be defined as the ratio between these concentrations in the regions immediately adjacent to the freezing front (k=concentration in solid÷concentration in liquid). The effect of the difference between the segregation coefficient of indium and that of phosphorus in the practice of the instant invention may be explained as follows:

When the alloy pellets are heated above their melting point they dissolve portions of the semi-conductor wafer, and as they are cooled the dissolved wafer material recrystallizes, largely upon the crystal structure of the wafer. As the freezing progresses the impurity material having the larger segregation coefficient is included in the recrystallized regions preferentially to the material having the smaller segregation coefficient. The difference between the coefficients of indium and of phosphorus is sufficiently great so that the entire recrystallized regions include substantially more phosphorus than indium.

The segregation coefficients for several impurity materials are:

| Impurity | Conductivity type in Germanium and Silicon | *k* in Germanium | *k* in Silicon |
|---|---|---|---|
| Indium | p | .001 | .0037 |
| Thallium | p | .00001 | .00013 |
| Phosphorus | n | 0.12 | 0.12 |
| Arsenic | n | .06 | .07 |
| Antimony | n | .005 | .012 |
| Gallium | p | 0.1 | 0.1 |

It will be seen that the coefficients vary greatly, in some cases by a factor of 10,000 or more. An alloyed electrode according to the invention, therefore, may include up to about 98 atomic percent of an impurity material of one type and only about 2% of an impurity material of the opposite type. The material present in the smaller quantity, however, is effective in controlling the conductivity type of the affected portions of the semi-conductor wafer. Since phosphorus atoms provide n-type conductivity in germanium the recrystallized regions heretofore described have n-type conductivity and p-n rectifying junctions are formed between the recrystallized regions and the p-type germanium of the major portion of the wafer.

The relatively favorable metallurgical properties of indium and thallium may thus be exploited in conjunction with the electrical effects provided by phosphorus and arsenic. The electrode materials according to the invention may closely approximate the metallurgical properties of pure indium or thallium, that is, they may be soft, ductile and readily alloyable with brittle semi-conductor bodies without producing deleterious strains. At the same time their effect on the conductivity type of the semi-conductor material is the opposite of that produced by alloying substantially pure indium or thallium, so that in germanium and silicon, for example, they produce n-type conductivity rather than p-type.

It is presently believed that the effect of diffusion beyond the alloy front in alloy type semi-conductor devices is of relatively minor importance. The diffusion coefficients of phosphorus and arsenic however are greater than the coefficients for indium and thallium so that even this relatively minor effect cooperates with the segregation effect to produce an alloy type junction according to the invention.

The diffusion coefficient of one material in another is a measure of the rate at which atoms of the one material diffuse throughout a body of the other. At elevated temperatures diffusion becomes relatively rapid and therefore of relatively greater importance than at lower temperatures. During the alloy process phosphorus and arsenic diffuse more rapidly and more deeply into the semi-conductor wafer than do indium and thallium. If the diffusion progresses far enough, a significant portion of the wafer beyond the alloy front may be affected in its conductivity type by the diffused material. Since the diffusion coefficients of phosphorus and arsenic are substantially greater than the diffusion coefficients of indium and thallium the effect on the conductivity type of the wafer will be determined by the phosphorus and arsenic rather than by indium or thallium. Diffusion, therefore, results merely in an extension of the zone of n-type conductivity material into the wafer beyond the recrystallized region and does not otherwise affect the process.

An important feature of the invention is the provision of an alloy electrode material comprising a solution, or mixture of two mutually opposite type impurity materials. One of the impurity materials is selected from among those having a relatively small segregation coefficient in the semi-conductor material. This impurity material may constitute a major proportion, up to 98 atomic percent, or more, of the mixture and may be selected on the basis of its physical or chemical properties without regard to its effect on the electrical properties of the semi-conductor. The second impurity material is selected from among those having a relatively large segregation coefficient in the semi-conductor material, at least about 50 times as large as the coefficient of the first material. This second impurity material is effective to control the electrical conductivity type of the semi-conductor wafer. Its physical and chemical properties are of relatively little importance because it may be included in the mixture in relatively small proportions. Other impurity materials that do not significantly affect the conductivity type of the semi-conductor material may be included in the mixture as diluents and to affect its metallurgical or chemical properties. In the cases of germanium and silicon these inert materials are principally tin and load. When surface alloying to silicon it is preferred to include up to about 5 atomic percent gold in the impurity mixture. The gold appears to have a solvent action on the silicon, to facilitate wetting of the silicon by the impurities and to provide a relatively deep penetration of the impurities into the silicon.

Especially satisfactory results, however, are provided by electrode materials comprising at least about 80 atomic percent indium, thallium or mixtures thereof and not more than about 20 atomic percent phosphorus or arsenic or mixtures thereof.

The practice of the invention is, of course, applicable to devices other than the particular transistor device heretofore described. Other types of transistors, for example, such as unipolar transistors and diode devices may include an electrode material of the invention.

Materials of the invention may also be alloyed to semi-conductor materials other than germanium and silicon. Aluminum antimonide, for example, is a semi-conductor that may be utilized to make transistors and other devices. The effects of impurity materials on the conductivity types of semi-conductors other than germanium, silicon and grey tin may not be the same as the effects on these materials. See, for example, the co-pending application of Dietrich A. Jenny, Serial No. 394,383, filed November 25, 1953, which discloses that in the semi-conductor cadmium telluride elements of the third column of the periodic table provide n-type conductivity. This is the opposite effect from that produced by these elements in germanium and silicon where they provide p-type conductivity.

What is claimed is:

A semi-conductor device comprising a base of semiconductive silicon, an electrode surface alloyed to a surface of said base and a rectifying barrier adjacent to said electrode, said electrode comprising a mixture of indium, gold and phosphorus, said indium and phosphorus being present in an atomic ratio of at least 8 parts indium to 2 parts phosphorus, and said gold constituting about 5 atomic percent of said electrode.

References Cited in the file of this patent

UNITED STATES PATENTS

| | | |
|---|---|---|
| 2,428,992 | Ransley | Oct. 14, 1947 |
| 2,583,008 | Olsen | Jan. 22, 1952 |
| 2,623,102 | Shockley | Dec. 23, 1952 |
| 2,701,326 | Pfann | Feb. 1, 1955 |
| 2,725,315 | Fuller | Nov. 29, 1955 |
| 2,739,088 | Pfann | Mar. 20, 1956 |
| 2,742,383 | Barnes | Apr. 17, 1956 |

FOREIGN PATENTS

| | | |
|---|---|---|
| 1,065,523 | France | Jan. 13, 1954 |

OTHER REFERENCES

Armstrong: Proceedings of Institute of Radio Engrs., vol. 40, November 1952, pages 1341 and 1342.

UNITED STATES PATENT OFFICE

CERTIFICATION OF CORRECTION

Patent No. 3,010,857 November 28, 1961

Herbert Nelson

It is hereby certified that error appears in the above numbered patent requiring correction and that the said Letters Patent should read as corrected below.

Column 1, line 17, after "is" strike out "one"; in same line 17, after "of" insert -- one --; line 24, after "of", first occurrence, insert -- the --; line 30, after "conductivity" insert -- to --; column 2, line 7, after "having" insert -- a --; line 64, for "front" read -- fronts --.

Signed and sealed this 24th day of April 1962.

(SEAL)
Attest:

ESTON G. JOHNSON
Attesting Officer

DAVID L. LADD
Commissioner of Patents